No. 793,381. PATENTED JUNE 27, 1905.
J. C. KORTICK.
SNAP HOOK.
APPLICATION FILED DEC. 2, 1904.

Witnesses:— Inventor,
F. C. Fliedner John C. Kortick
By Geo. H. Strong, Atty.

No. 793,381.

Patented June 27, 1905.

UNITED STATES PATENT OFFICE.

JOHN C. KORTICK, OF SAN FRANCISCO, CALIFORNIA, ASSIGNOR TO GEORGE H. EBERHARD, OF SAN FRANCISCO, CALIFORNIA.

SNAP-HOOK.

SPECIFICATION forming part of Letters Patent No. 793,381, dated June 27, 1905.

Application filed December 2, 1904. Serial No. 235,146.

*To all whom it may concern:*

Be it known that I, JOHN C. KORTICK, a citizen of the United States, residing in the city and county of San Francisco and State of California, have invented new and useful Improvements in Snap-Hooks, of which the following is a specification.

My invention relates to improvements in hooks of that class known as "snap-hooks;" and it consists in a novel construction and operation of a tongue or keeper in connection with the hook.

It also comprises details of construction, which will be more fully explained by reference to the accompanying drawings, in which—

Figure 1:
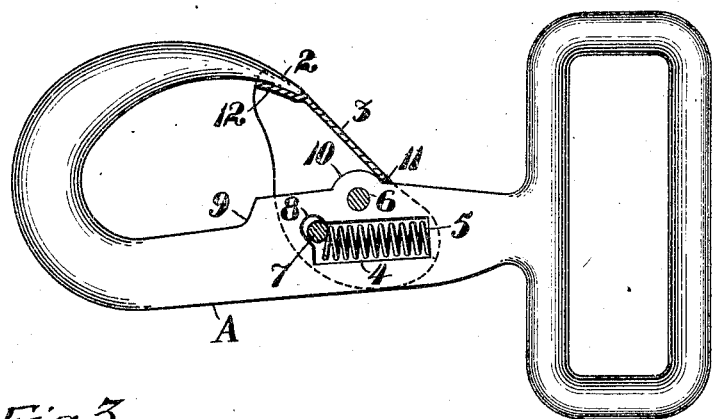
Figure 3:
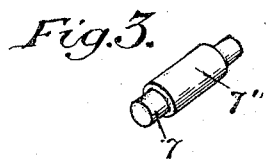
Figure 2:
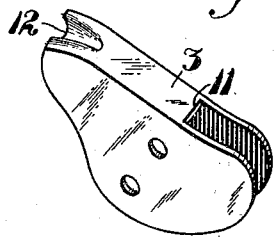
Figure 4:
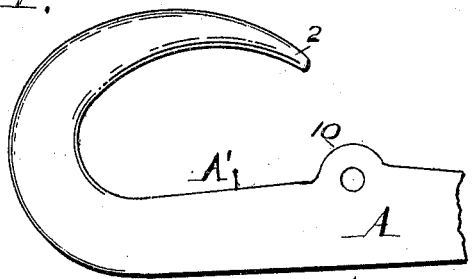

Figure 1 is a side view of my improved hook, showing keeper in section. Fig. 2 is a perspective view of the keeper. Fig. 3 is a detail of a pin 7 with an antifriction-sleeve. Fig. 4 is a modified form of hook.

It is the object of my invention to provide improvements in hooks through which detachable connections are made with harness or other parts and which it is desired to engage or disengage.

As shown in the accompanying drawings, A is the shank of a hook turned over to form an engaging point 2, and 3 is a tongue or keeper which is designed to extend across the opening of the hook when closed to prevent the disengaging of the hook from the other member of the connecting device. In order to retain the keeper in a normally closed position across the hook-opening, I have shown the following construction: Through the shank A of the hook is punched an oblong opening, which is preferably rectangular in shape and which being punched is easily formed at small expense and needs little or no finish. Within this opening 4 is fitted a coiled spring 5 of sufficient tension, this spring extending from end to end of the opening. The tongue or keeper 3 is what may be termed "box-shaped"—that is to say, there are two sides extending down upon each side of the shank A and fitting closely against it, these sides being united by a top portion of such width as to fit over the thickness of the shank and retain these sides closely enough against the sides of the shank to make a sufficiently tight joint without interfering with the free movement of the keeper. The sides of the keeper are perforated, and a corresponding hole is made through the shank A, so that by means of a pin or rivet 6 passing through these holes the keeper is pivoted to the upper or inner part of the shank. The sides of the keeper extending down, as previously described, inclose and cover the slot containing the spring, and thus prevent any ingress of dirt into the cavity. Through the lower part of these sides and opposite to the slot or channel 4 holes are made for the introduction of a pin or rivet 7. This rivet passes between the end of the spring and the end of the opening which is nearest to the hook, and the tension of the spring acting against this rivet holds the keeper in position to close the hook-opening. When the keeper is pressed down, the pin 7, moving in a small arc of a circle, acts against the end of the spring to compress it, thus allowing the keeper to be depressed and the hook-opening exposed. As soon as the keeper is released the spring will act and again close it. In order to reduce friction of the pin against the spring, I prefer to either fit a loose sleeve 7', Fig. 3, upon the pin or rivet or to fit the rivet itself loosely in the holes through which it passes, so that it will easily rotate as it moves against the end of the spring, and no appreciable wear will thus take place. In order to properly introduce the pin or rivet between the end of the spring and the end of the chamber 4, I have shown one angle of the chamber as having an extension or groove, as shown at 8. This extension being beyond the end of the chamber and round or segmental in shape allows the pin or rivet 7 to be easily introduced through it and behind the spring. The hook may merge into the shank gradually, as shown at A' in Fig. 4, or be curved to form a shoulder, as at 9, which will receive any back pressure of the link or connection with which the hook is engaged, and thus prevent it from unduly striking against or pressing upon the edges of the keeper. The inner or upper portion of the shank A is shown convex, as shown at 10, the convexity being an arc around which the pin 6 and its hole are the center. The back of the keeper is cut away, as shown at 11, and this cut-away portion moves over the arc or segment, so that when the keeper is opened or closed the edge of this opening will maintain a substantially tight joint at this point and taken in conjunction with the close fitting of the sides of the keeper will prevent any ingress of dirt or substance which might clog the action of the spring. The tip of the keeper which engages with the point of the hook is depressed, as shown at 12, to form a sunken channel in which the point of the hook lies when closed. This serves to inclose the point of the hook and prevent its catching if the hook should be dragged across substances with which it would be liable to catch. It also prevents side movement of the keeper.

Having thus described my invention, what I claim, and desire to secure by Letters Patent, is—

1. In a snap-hook, a shank having a rectangular opening punched through it, a coiled spring fitting said opening, a keeper having downturned sides inclosing the sides of the opening, said keeper being pivoted at the upper or inner part of the shank, and a second pin passing through the downturned portions and adapted to engage the spring.

2. In a snap-hook, a shank having an opening with sides parallel to those of the shank, a coiled spring located in the opening, a keeper with edges turned to inclose the sides of the shank and the spring-chamber, a fulcrum-pin passing through the keeper and inner side of the shank, a second pin passing through the keeper and the spring-chamber, said chamber having an extension to admit the pin beyond the end of the spring.

3. A snap-hook comprising a shank having a rectangular opening, a spring fitting said opening, a keeper having downturned sides inclosing the said opening in the shank, a fulcrum-pin connecting the keeper with the inner side of the shank, said shank having a portion of its edge curved in an arc concentric with the pin, and said keeper having its back adapted to move in contact with said arc when the keeper is opened or closed, and a second pin carried by the keeper and passing transversely through the shank and said opening for engaging the spring.

In testimony whereof I have hereunto set my hand in presence of two subscribing witnesses.

JOHN C. KORTICK.

Witnesses:
S. H. NOURSE,
HENRY P. TRICOU.